(12) United States Patent
Caselli et al.

(10) Patent No.: US 8,327,364 B2
(45) Date of Patent: Dec. 4, 2012

(54) METHOD OF MINIMIZING AVERAGE DEVIATION OF JOB COMPLETION TIMES BY EXECUTING DATA RETRIEVAL JOBS IN ORDER OF DECREASING RETRIEVAL TIMES

(75) Inventors: Umberto Caselli, Rome (IT); Atlilio Mattlocco, Rome (IT)

(73) Assignee: International Business Machines Corporation, Armonk, NY (US)

( * ) Notice: Subject to any disclaimer, the term of this patent is extended or adjusted under 35 U.S.C. 154(b) by 1426 days.

(21) Appl. No.: 11/935,727

(22) Filed: Nov. 6, 2007

(65) Prior Publication Data

US 2008/0148266 A1    Jun. 19, 2008

(30) Foreign Application Priority Data

Dec. 19, 2007  (EP) .................................... 06126453

(51) Int. Cl.
*G06F 9/46* (2006.01)
(52) U.S. Cl. ........................ 718/102; 718/100
(58) Field of Classification Search .................. None
See application file for complete search history.

(56) References Cited

U.S. PATENT DOCUMENTS

| | | | |
|---|---|---|---|
| 5,327,526 A * | 7/1994 | Nomura et al. ............... | 358/1.16 |
| 5,392,430 A | 2/1995 | Chen | |
| 5,619,692 A | 4/1997 | Malkemus et al. | |
| 6,170,042 B1 * | 1/2001 | Gaertner et al. ............... | 711/158 |
| 2004/0010586 A1 * | 1/2004 | Burton et al. .................. | 709/224 |
| 2004/0010716 A1 * | 1/2004 | Childress et al. .............. | 713/201 |
| 2005/0144189 A1 * | 6/2005 | Edwards et al. ............... | 707/102 |
| 2005/0149612 A1 * | 7/2005 | Messinger et al. ............. | 709/200 |
| 2006/0168151 A1 * | 7/2006 | Caselli et al. .................. | 709/219 |

OTHER PUBLICATIONS

Bagchi et al., "Minimizing Mean Squared Deviation of Completion Times About a Common Due Date," Management Science, vol. 33, No. 7, Jul. 1987, pp. 894-906.*
John J. Kanet, "Minimizing the average deviation of job completion times about a common due date," Naval Research Logistics Quarterly, vol. 28, Issue 4, pp. 643-651, Dec. 1981.*
Xiaohua Weng and Jose A. Ventura, "Scheduling about a given common due date to minimize mean squared deviation of completion times," European Journal of Operational Research, vol. 88, Issue 2, Jan. 20, 1996, pp. 328-335.*

* cited by examiner

*Primary Examiner* — Jennifer To
*Assistant Examiner* — Benjamin Wu
(74) *Attorney, Agent, or Firm* — Yee & Associates, P.C.; Jeffrey S. LaBaw

(57) ABSTRACT

A solution for retrieving data from a plurality of different sources, wherein the data are retrieved from the different sources by means of respective data retrieval jobs having respective execution times. A data retrieval jobs execution list is built by ordering the data retrieval jobs to be executed in order of decreasing execution times. Next, the data retrieval jobs are executed according to the data retrieval jobs execution list.

15 Claims, 5 Drawing Sheets

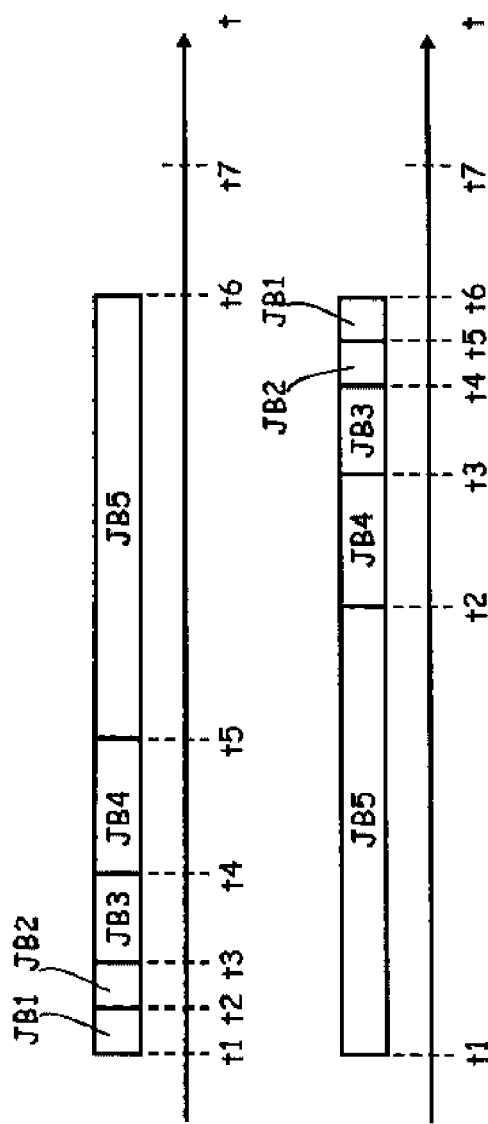
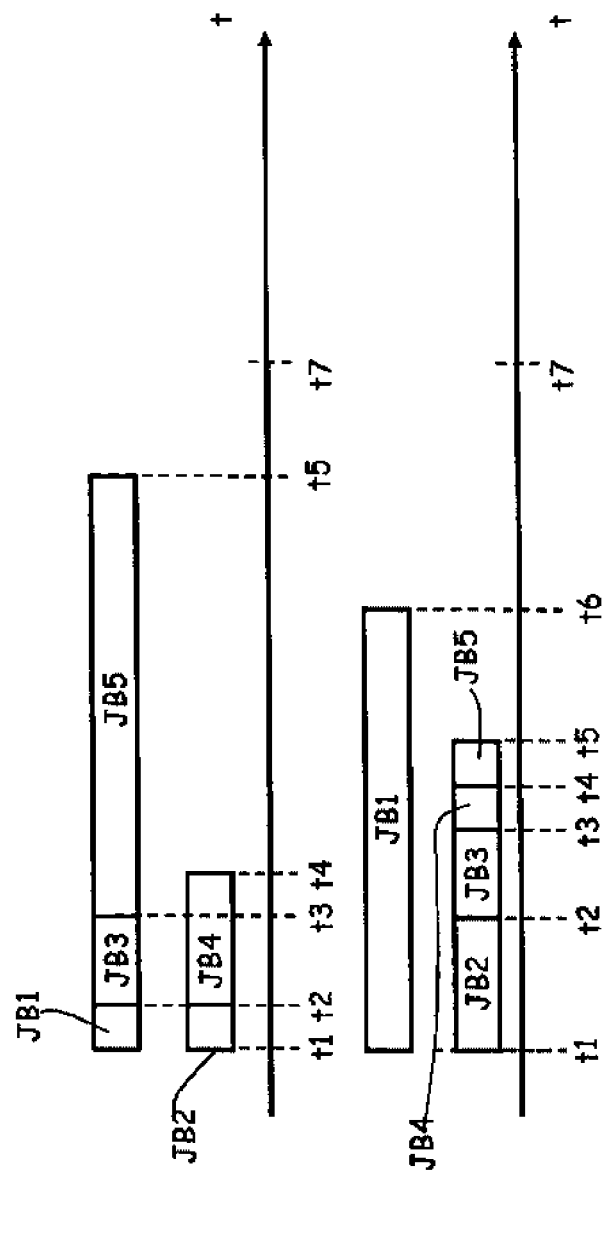

METHOD OF MINIMIZING AVERAGE DEVIATION OF JOB COMPLETION TIMES BY EXECUTING DATA RETRIEVAL JOBS IN ORDER OF DECREASING RETRIEVAL TIMES

TECHNICAL FIELD

The present invention generally relates to the field of electronic data processing (computing), particularly to distributed computing and data processing system networks (shortly, computer networks). More specifically, the invention concerns a method for reducing differences in the time of retrieval of data retrieved from different sources.

BACKGROUND ART

In the field of electronic data processing, it often occurs that a software application (computer program) has to deal with data retrieved from two or more different sources.

In these cases, it may be critical, or at least desirable, for the software application that has to process the retrieved data, that the latter are retrieved, as far as possible, at the same time, or at least with a minimum difference in the time of retrieval of the data from the various sources.

An example in which this requirement exists is that of a Graphical User Interface (GUI) which has to display to a user contents retrieved by different jobs, sharing a limited set of resources, for example a Web browser that has to display a Web page including links to contents that are spread through the Internet.

Another example is the so-called "heartbeat mechanism" that is implemented in the IBM Tivoli Monitoring tool, sold by IBM Corporation, for monitoring the basic health state of endpoints of a distributed data processing system: in this case, a heartbeat monitor phases its polls to a repository of data gathered from the different endpoints whose state is to be monitored based on a predictive algorithm that makes use of an indication of age of the data gathered from the endpoints. Thus, ensuring that the times of retrieval of the data differ as less as possible is important in order to reduce the number of polls, and to always have an up-to-date picture of the system state.

SUMMARY OF THE INVENTION

The present invention provides a solution for retrieving data from a plurality of different sources, wherein the data are retrieved from the different sources by means of respective data retrieval jobs having respective execution times. A data retrieval jobs execution list is built by ordering the data retrieval jobs to be executed in order of decreasing execution times. Next, the data retrieval jobs are executed according to the data retrieval jobs execution list.

BRIEF DESCRIPTION OF THE DRAWINGS

The features and advantages of the present invention will be made apparent by the following detailed description of an embodiment thereof, provided merely by way of non-limitative example, description that will be made in conjunction with the attached drawing sheets, wherein:

FIGS. 4A and 5B are simplified time diagrams comparatively showing five data retrieval jobs executed in a conventional manner and according to an embodiment of the present invention, respectively;

FIGS. 5A and 5B are simplified time diagrams comparatively showing the five data retrieval jobs of FIGS. 4A and 4B, executed in multi-thread way, in a conventional manner and according to an embodiment of the present invention, respectively.

DETAILED DESCRIPTION OF THE PREFERRED EMBODIMENT

Figure 1:
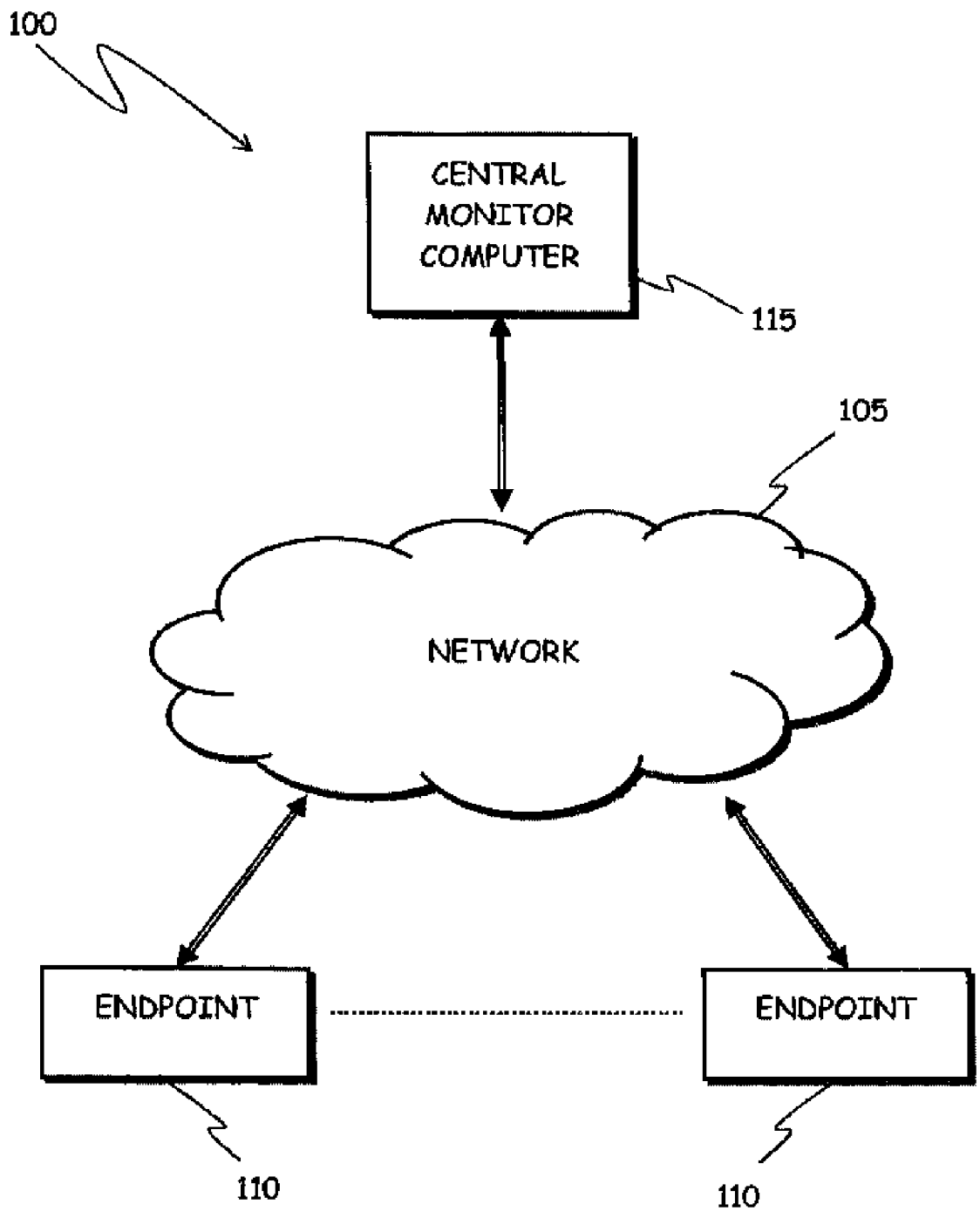
FIG. 1 is a schematic block diagram of a data processing system in which the method according to an embodiment of the present invention is applicable.

With reference to FIG. 1, a schematic block diagram of an exemplary data processing system 100 is illustrated, in which a method according to an embodiment of the present invention can be applied with beneficial effects.

In particular, the exemplary data processing system 100 considered in the invention embodiment being herein described has a distributed architecture, based on a data communications network 105, which may consist of a private LAN (Local Area Network), e.g. an Ethernet, MAN (Metropolitan Area Network), WAN (Wide Area Network), or a public network like the Internet. The data processing system 100 may in particular be the production environment, i.e., the information infrastructure of a SOHO (Small Office/Home Office environment), or of an enterprise, a corporation, a government agency or the like.

The data processing system 100 of the invention embodiment herein considered implements a resource-management environment, adapted to managing several kinds of resources (consisting of any logical or physical entities). Particularly, multiple local computers or endpoints 110 directly control resources under management, and a central monitor computer 115 is responsible of monitoring and managing the resources of the system 100. The endpoints 110 and the central monitor computer 115 communicate through the network 105. The central monitor computer may in the practice comprise two or more central monitor computers, each one responsible of monitoring and managing a respective group of endpoints.

In particular, the data processing system 100 may be administered through the IBM Tivoli Monitoring software tool mentioned in the foregoing, a tool that provides distributed monitors for monitoring the resources of the data processing system 100, said monitors being deployed to the individual endpoints 110, and being centrally configured (e.g., from the central monitor computer 115).

The central monitor computer(s) 115 may in turn be in communication with a server (which, in the Tivoli Management Framework is referred to as the "TMR server", where TMR stands for Tivoli Management Region), in which case the central monitor computer(s) behaves as a gateway to a respective management region.

Figure 2:
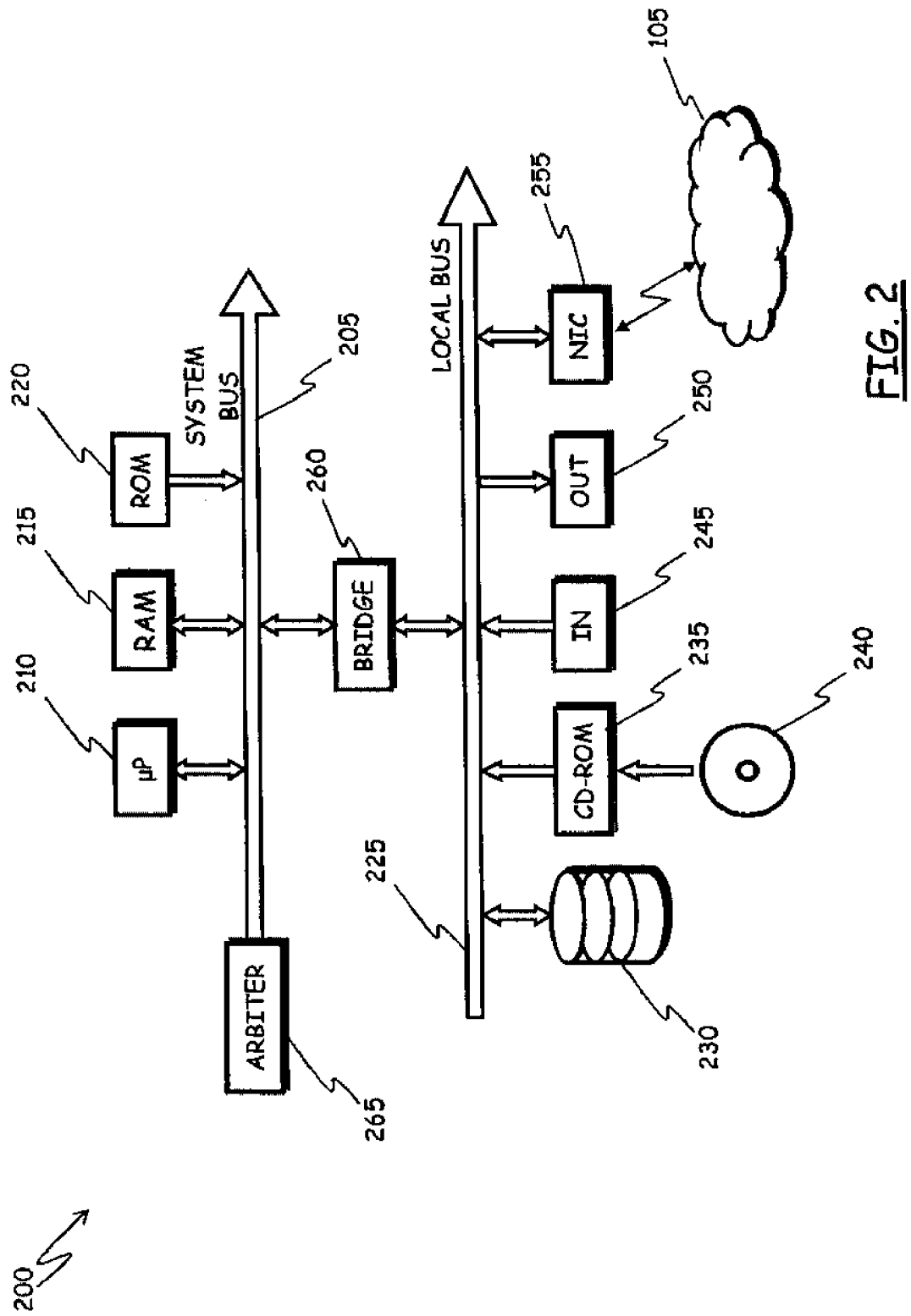
FIG. 2 shows the functional blocks of a generic computer of the data processing system of FIG. 1.

As shown in FIG. 2, a generic computer 200 of the data processing system 100, such as the generic endpoint 110 or the central monitor computer 115, is comprised of several units that are connected in parallel to a system bus 205. In detail, one or more microprocessors (μP) 210 control the operation of the computer 200; a RAM (Random Access Memory) 215 is directly used as a working memory by the microprocessors 210, and a ROM 220 stores the basic code for a bootstrap of the computer 200. Peripheral units are connected (by means of respective interfaces) to a local bus 225. Particularly, mass storage devices comprise a hard disk 230 and a CD-ROM/DVD-ROM drive 235 for reading (and, possibly, writing) CD-ROMs/DVD-ROMs 240. Moreover, the computer 200 includes input devices 245, for example a keyboard and a mouse, and output devices 250, such as a display device (monitor) and a printer. A Network Interface Card (NIC) 255 is used to connect the computer 200 to the network 105. A bridge unit 260 interfaces the system bus 205 with the local bus 225. Each microprocessor 210 and the bridge unit 260 can operate as master agents requesting an access to the system bus 205 for transmitting information; an arbiter 265 manages the granting of the access to the system bus 205.

Figure 3:
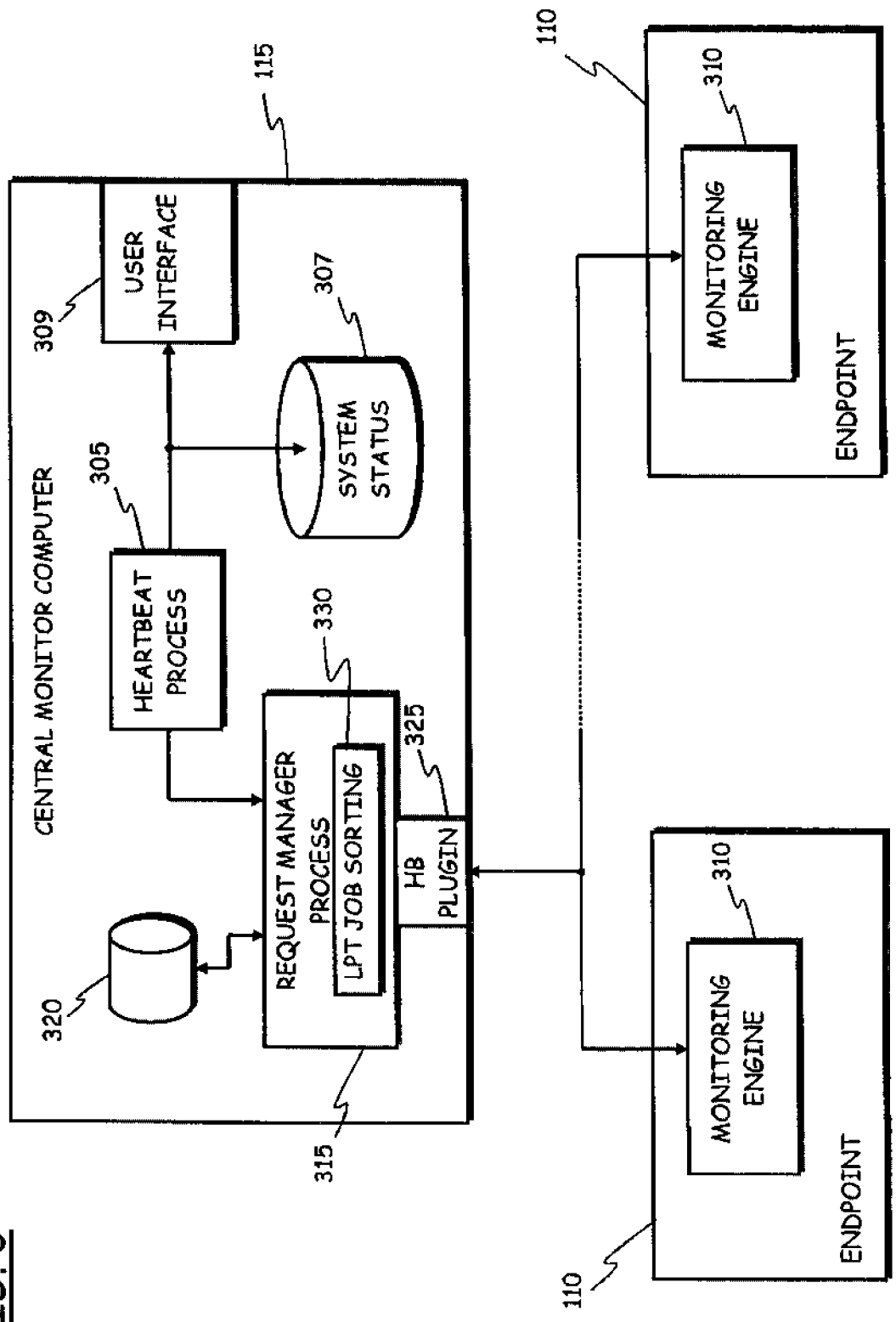
FIG. 3 depicts, in terms of functional blocks, the components, including software components, implementing a method according to an embodiment of the invention.

In FIG. 3, the essential components, including software components (e.g., modules of software applications when executed), of the IBM Tivoli Monitoring tool are schematically shown. The information (programs and data) is typically stored on the hard disks of the computers, and it is loaded (at least partially) into the corresponding working memories when the programs are running. The programs are initially installed onto the computers' hard disks from, e.g., CD-ROMs or DVD-ROMs, or they may be downloaded from, e.g., a distribution server machine through the data communications network 105.

A heartbeat process 305 runs in the central monitor computer 115 for monitoring the endpoints 110 of the data processing system 100 (or at least of those endpoints that are under the responsibility of the central monitor computer 115). As mentioned in the foregoing, the heartbeat process 305 is adapted to implement a heartbeat mechanism for monitoring the basic health state of the endpoints 110, where a monitoring engine 310 has been deployed and is running. In particular, in order to be inserted in a list of endpoints monitored by the heartbeat process 305, the generic endpoint 110 needs to have successfully registered to the central monitor computer 115. The heartbeat process 305 is adapted to maintain the status of all the registered endpoints, so that if the status of any endpoint changes, this can be reported, e.g. to a system administrator (or generally to the IT staff) and the appropriate action(s) can be taken. The heartbeat process 305 is in particular adapted to detect whether the endpoint is alive (the monitor engine 310 is running and all the resource models are in order; if one or more of the resources managed by the generic endpoint do not conform to the respective resource model, an error condition may be declared); whether a particular endpoint has migrated to a different central monitor computer; if, despite a generic endpoint is reachable, the monitor engine is not running; if the endpoint is not reachable. The heartbeat process 305 stores the data related to the status of the endpoints in a system status database 307, from which the information about the system status can be accessed through a user interface 309.

In order to poll the endpoints 110 for ascertaining their status, the heartbeat process 305 exploits the services of a request manager process 315. In particular, the heartbeat process 305 acts as a client of the request manager process 315, which acts as the server in a client-server interaction architecture. The heartbeat process 305 schedules status requests, which are then served by the request manager process 315 at their expiration time. Typically, the times of the polls to the endpoints are based on a predictive algorithm, implemented by the heartbeat process, that makes use of an indication of age of the data gathered from the endpoints.

The request manager process 315 is adapted to collect, store and manage requests to be sent to the endpoints 110, which requests are created and used by the heartbeat process 305, as well as by other components and applications of the monitoring tool (e.g., a Web health console, a data collector). The request manager process 315 acts like a down-call concentrator: it receives requests from the components and applications of the monitoring tool, e.g. from the heartbeat process, and concentrates the received requests into one request to the appropriate endpoint.

A generic request from a component or application of the monitoring tool to the request manager process 315 contains the following information: a type, describing the availability/performance data that have to be retrieved; a refresh interval, defining a periodicity with which the request manager process will refresh the data from the endpoints; a list of endpoints, to be addressed by the request.

The request manager process 315 exploits a memory cache 320 where the data requested to the endpoints are stored once the endpoints return them. The components and applications of the monitoring tool, like the heartbeat process 305, can then retrieve the data from the memory cache 320 through the request manager process 315.

The handling of the different types of requests that the request manager 315 receives from the components and applications of the monitoring tool, as well as the processing of the data returned by the endpoints are managed by request manager plug-ins, like for example the plug-in 325 shown in the drawing which is responsible of handling the requests that come from the heartbeat process 305, and to process the data that arrive from the endpoints in response to the requests submitted thereto. The request manager 315 passes the generic request to the plug-in that is appropriate for that type of request, and the plug-in understands how to implement the request and what to do with the data gathered from the endpoints.

The request manager 315 implements an internal request queue and an action queue. Requests received from the components and applications of the monitoring tool, e.g. from the heartbeat process, are put in the request queue waiting for being served. The request queue is constantly scanned checking for requests that need to be actioned. When requests that need to be actioned are found in the request queue, they are moved into the action queue, where they are executed via the appropriate plug-in.

Requests to be actioned are essentially jobs to be executed; each job has a respective processing time (the time necessary for executing the job). Normally, requests in the action queue are actioned (i.e., the jobs are executed) in an order such that jobs that have shorter processing times are executed first. In greater detail, the first time the jobs are schedules, their order of execution is completely random; as time goes by, the jobs are re-scheduled according to their end time (i.e. the first job that finishes is the first to be put in the queue again); thus, at regime, the order of execution of the jobs is such that shorter jobs are executed first than longer jobs.

Referring to FIG. 4A, let it be assumed that five requests, i.e., five jobs JB1, JB2, JB3, JB4 and JB5 are to be executed, having processing times PT1, PT2, PT3, PT4 and PT5; just by way of example, let it be assumed that PT1=PT2=1 UT (Unit of Time); PT3=2 UT; PT4=3 UT; PT5=10 UT (a unit of time being an arbitrary time interval). Executing the jobs serially, in order of increasing processing time, as depicted in FIG. 4A, means that the first job JB1 starts being executed at instant t1 and ends at instant t2=t1+1 UT; job JB2 starts being executed (at best) at instant t2 and ends at instant t3=t2+1 UT=t1+2 UT; job JB3 starts being executed (at best) at instant t3 and ends at instant t4=t3+2 UT=t1+4 UT; job JB4 starts being executed (at best) at instant t4 and ends at instant t5=t4+3 UT=t1+7 UT; and job JB5 starts being executed (at best) at instant t5 and ends at instant t6=t5+10 UT=t1+17 UT. Assuming that the heartbeat process 305 reads the data stored in the memory cache 320 of the request manager 315 at instant t7, 2 UT after instant t6, the sum of ages of the retrieved data will be:

Sum of ages=2 $UT$+12 $UT$+15 $UT$+17 $UT$+18 $UT$=64 $UT$.

The situation is slightly better in case the request manager 315 is capable of implementing multiple threads, as depicted in FIG. 5A. In the shown example, it is assumed that in a first thread the jobs JB1, JB3 and JB5 are executed sequentially, and in a second thread, concurrent to the first thread, the jobs JB2 and JB4 are executed sequentially. In particular, jobs JB1 and JB2 both start being executed at instant t1; in the first thread, job JB1 ends at instant t2=t1+1 UT, then job JB3 is started, which ends at instant t3=t2+2 UT=t1+3 UT; job JB5 is then started, which terminates at instant t5=t3+10 UT=t1+13 UT. In the second thread, job JB4 is started after completion of job JB2, at best at instant t2; job JB4 ends at instant t4=t2+3 UT=t1+4 UT. Assuming that the heartbeat process 305 reads the data stored in the memory cache 320 of the request manager 315 at instant t7, 2 UT after instant t5, the sum of ages of the retrieved data will be:

Sum of ages=2 $UT$+12 $UT$+14 $UT$+11 $UT$+14 $UT$=53 $UT$.

In both cases, the differences in the time of retrieval of the data from the endpoints are significant, and a measure of this is given by the sum of ages of the data.

Figure 6:
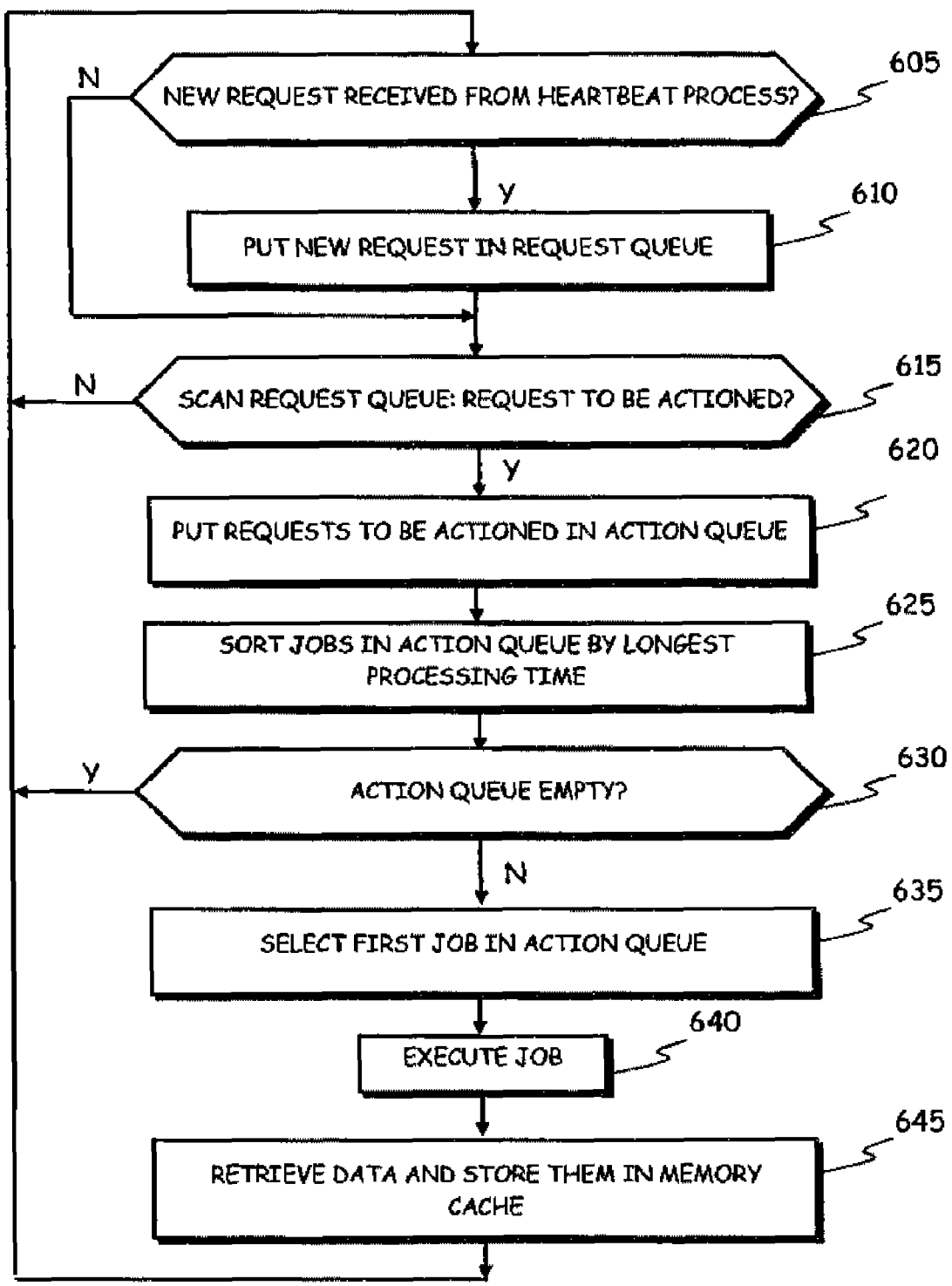
FIG. 6 is a schematic flowchart showing the main actions of a method according to an embodiment of the present invention.

Hereinafter, a method according to an embodiment of the present invention which is adapted to reduce the differences in the time of retrieval of the data will be described, making reference to the flowchart of FIG. 6.

When the request manager process 315 receives a new request from the heartbeat process 305 (decision block 605, exit branch Y), the request manager process 315 puts the newly received request in the request queue (block 610).

The request manager process 315 scans the request queue (block 615), looking for requests ready to be actioned; requests ready to be actioned are put into the action queue (block 620).

According to an embodiment of the present invention, the request manager sorts the requests in the action queue by means of a Longest Processing Time (LPT) algorithm, so that requests, i.e. jobs that are characterized by longer processing times precedes, in a job execution list, jobs having shorter processing times; in other words, the jobs to be executed are ordered according to decreasing processing times. The LPT sorting is for example accomplished by an LPT job sorting process 330, part of or invoked by the request manager process 315.

If the action queue is not empty of jobs to be executed (decision block 630, exit branch N), the request manager process 315 selects the first job to be executed from the ordered job execution list (block 635); the job is then executed (block 640). For handling the execution of the job, the request manager process 315 exploits the appropriate plug-in, for example the plug-in 325 of the heartbeat process 305. The request is thus sent to the appropriate endpoint 110, and the data retrieved therefrom are saved in the memory cache 320 of the request manager process 315 (block 645), where they can be retrieved by the heartbeat process 305. The operations are then repeated.

FIG. 4B allows appreciating the difference between executing the jobs in a decreasing processing time execution order compared to the traditional, increasing processing time execution order (FIG. 4A). Executing the jobs serially (single thread), in order of decreasing processing time, means that the first job to be executed is job JB5, which starts being executed at instant t1 and ends at instant t2=t1+10 UT; the second job to be executed is job JB2, which starts being executed (at best) at instant t2 and ends at instant t3=t2+3 UT=t1+13 UT; job JB3 is the third in order of execution, and starts being executed (at best) at instant t3, ending at instant t4=t3+2 UT=t1+15 UT; job JB2 starts being executed (at best) at instant t4 and ends at instant t5=t4+1 UT=t1+16 UT; and job JB1 starts being executed (at best) at instant t5 and ends at instant t6=t5+1 UT=t1+17 UT. Assuming that the heartbeat process 305 reads the data stored in the memory cache 320 of the request manager 315 at instant t7, 2 UT after instant t6, the sum of ages of the retrieved data will be:

Sum of ages=2 $UT$+3 $UT$+4 $UT$+6 $UT$+9 $UT$=24 $UT$

Compared to the situation depicted in FIG. 4A, the sum of ages is significantly lower (almost one third), thus the difference in the retrieval times of the data gathered from the endpoints is significantly reduced.

Benefits are also achieved in case the request manager process 315 is capable of implementing multiple threads, as depicted in FIG. 5B. In the shown example, it is assumed that in a first thread the longest job JB5 is executed, while in a second thread, concurrent to the first thread, the jobs JB4, JB3, JB2 and JB1 are executed sequentially, in order of decreasing processing time. In particular, the job JB5 starts being executed at instant t1, and ends at instant t6=t1+10 UT; in the second thread, the job JB4 starts being executed at instant t1, and ends at instant t2=t1+3 UT; job JB3 is then started, at best at instant L2, and terminates at instant t3=t2+2 UT=t1+5 UT; job JB2 is started after completion of job JB3, at best at instant t3, and ends at instant t4=t3+1 UT=t1+6 UT; finally, job JB1 starts being executed (at best) at instant t4, and ends at instant t5=t4+1 UT=t1+7 UT. Assuming that the heartbeat process 305 reads the data stored in the memory cache 320 of the request manager 315 at the same instant t7 as in the example of FIG. 5A, 15 UT after instant t1, the sum of ages of the retrieved data will be:

Sum of ages=5 $UT$+8 $UT$+9 $UT$+10 $UT$+12 $UT$=44 $UT$ which is lower than that obtained in case the jobs are executed according to an increasing processing time criterion.

Thus, thanks to the present invention, the differences in the time of retrieval of the data from the different sources are reduced, with great benefit of the software applications that exploit the retrieved data.

Although the present invention has been described by way of an embodiment, it is apparent to those skilled in the art that several modifications to the described embodiments, as well as other embodiments of the present invention are possible without departing from the scope thereof as defined in the appended claims.

For example, although described making reference to the context of a distributed data processing system monitoring software tool, like the Tivoli monitoring tool sold by IBM Corp., the invention is not thus limited, and can be applied in several different contexts. Just to cite an example, the invention can be advantageously applied in the case of a Graphical User Interface (GUI) when contents are to be displayed to a user including data that need to be retrieved from different sources, by means of different data retrieval jobs sharing a limited set of resources (either communication resources or processing resources of the data processing apparatus where the GUI is executed). Executing the data retrieval jobs in order of decreasing processing time allows reducing the time gaps in the time of retrieval of the different pieces of information from the different sources. For example, in the case of a Web browser, it can be avoided that some frames are filled quickly, while some other frames remain empty (in wait for the data to be retrieved) or they are not updated for long times.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of the present description, a computer-usable or computer-readable medium can be any apparatus, device or element that can contain, store, communicate, propagate, or transport the program for use by or in connection with the computer or instruction execution system.

The medium can be an electronic, magnetic, optical, electromagnetic, infrared, or semiconductor storage medium, network or propagation medium. Examples of a storage medium include a semiconductor memory, fixed storage disk, moveable floppy disk, magnetic tape, and an optical disk. Current examples of optical disks include compact disk-read only memory (CD-ROM), compact disk-read/write (CD-R/W) and digital versatile disk (DVD). Examples of a propagation medium include wires, optical fibers, and wireless transmission.

The invention can be applied in a data processing system having a different architecture or based on equivalent elements; each computer can have another structure or it can be replaced with any data processing entity (such as a PDA, a mobile phone, and the like).

The invention claimed is:

1. A method of collecting data from a plurality of different sources by a data processing system executing a plurality of data retrieval jobs, wherein each of the data is collected from the plurality of different sources by a respective one of the plurality of data retrieval jobs having a respective data retrieval time, the method comprising steps performed by the data processing system of:
   building at least two data retrieval job execution lists by placing each of the plurality of data retrieval jobs in one of the at least two data retrieval job execution lists and ordering the data retrieval jobs within each of the lists in an order of decreasing data retrieval times; and
   executing, in the order of decreasing data retrieval times, the data retrieval jobs in the at least two data retrieval job execution lists to collect the data from the plurality of different sources, wherein the data retrieval jobs are executed in parallel by at least two concurrent threads, with each thread assigned to each of the at least two data retrieval job list.

2. The method of claim 1, wherein the plurality of different sources are endpoints of a distributed data processing system, and the data to be retrieved are collected in order to provide indications about an operating condition of the endpoints to a heartbeat monitor of the data processing system.

3. The method of claim 2, further comprising:
   receiving a plurality of requests from the heartbeat monitor and placing the plurality of requests in a request queue;
   scanning the request queue looking for at least one request ready to be performed; and
   placing the at least one request ready to be performed in an action queue.

4. The method of claim 3, further comprising:
   sorting the action queue to order the at least one request ready to be performed with respect to decreasing processing times necessary to perform each of the at least one request.

5. The method of claim 1, further comprising:
   providing the retrieved data from the plurality of different sources to a graphical user interface for displaying information to a user.

6. A system for collecting data from a plurality of different sources by executing a plurality of data retrieval jobs, wherein each of the data is collected from the plurality of different sources by a respective one of the plurality of data retrieval jobs having a respective data retrieval time, the system comprises of:
   the plurality of different sources; and
   a processor coupled to a memory storing program instructions that are operable, when executed by the processor, to perform the steps of:
   building at least two data retrieval job execution lists by placing each of the plurality of data retrieval jobs in one of the at least two data retrieval job execution lists and ordering the data retrieval jobs within each of the lists in an order of decreasing data retrieval times; and
   executing, in the order of decreasing data retrieval times, the data retrieval jobs in the at least two data retrieval job execution lists to collect the data from the plurality of different sources, wherein the data retrieval jobs are executed in parallel by at least two concurrent threads, with each thread assigned to each of the at least two data retrieval job list.

7. The system of claim 6, wherein the plurality of different sources are endpoints of a distributed data processing system, and the data to be retrieved are collected in order to provide indications about an operating condition of the endpoints to a heartbeat monitor of the data processing system.

8. The system of claim 7, wherein the steps further comprises of:
   receiving a plurality of requests from the heartbeat monitor and placing the plurality of requests in a request queue;
   scanning the request queue looking for at least one request ready to be performed; and
   placing the at least one request ready to be performed in an action queue.

9. The system of claim 8, wherein the steps further comprises of:
   sorting the action queue to order the at least one request ready to be performed with respect to decreasing processing times necessary to perform each of the at least one request.

10. The system of claim 6, wherein the steps further comprises of:
    providing the retrieved data from the plurality of different sources to a graphical user interface for displaying information to a user.

11. A non-transitory computer-readable storage medium comprising program instructions stored thereon, when executed by a processor, perform a method of collecting data from a plurality of different sources by a data processing system executing a plurality of data retrieval jobs, wherein each of the data is collected from the plurality of different sources by a respective one of the plurality of data retrieval jobs having a respective data retrieval time, the method comprises steps of:

building at least two data retrieval job execution lists by placing each of the plurality of data retrieval jobs in one of the at least two data retrieval job execution lists and ordering the data retrieval jobs within each of the lists in an order of decreasing data retrieval times; and executing, in the order of decreasing data retrieval times, the data retrieval jobs in the at least two data retrieval job execution lists to collect the data from the plurality of different sources, wherein the data retrieval jobs are executed in parallel by at least two concurrent threads, with each thread assigned to each of the at least two data retrieval job list.

12. The non-transitory computer-readable storage medium of claim 11, wherein the plurality of different sources are endpoints of a distributed data processing system, and the data to be retrieved are collected in order to provide indications about an operating condition of the endpoints to a heartbeat monitor of the data processing system.

13. The non-transitory computer-readable storage medium of claim 12, wherein the method further comprises the steps of:

receiving a plurality of requests from the heartbeat monitor and placing the plurality of requests in a request queue;

scanning the request queue looking for at least one request ready to be performed; and placing the at least one request ready to be performed in an action queue.

14. The non-transitory computer-readable storage medium of claim 13, wherein the method further comprises the step of:

sorting the action queue to order the at least one request ready to be performed with respect to decreasing processing times necessary to perform each of the at least one request.

15. The non-transitory computer-readable storage medium of claim 11, wherein the method further comprises the step of:

providing the retrieved data from the plurality of different sources to a graphical user interface for displaying information to a user.

* * * * *